April 2, 1935.　　　　R. B. NEWBERN　　　　1,996,384

VALVE

Filed July 24, 1933

INVENTOR
Raymond B. Newbern
BY
James Harrison Bowen
ATTORNEY

Patented Apr. 2, 1935

1,996,384

UNITED STATES PATENT OFFICE 1,996,384

VALVE

Raymond B. Newbern, Seattle, Wash.

Application July 24, 1933, Serial No. 681,812

6 Claims. (Cl. 277—3)

The purpose of this invention is to provide a double or combination valve for simplifying the connection to a $CO_2$ container when transferring liquid carbondioxide from one container to another by gravity in which it is necessary to use one connection from the lower end of the supply container and a bypass back to the top of the supply container, and connect both of these into the single connection at the upper end of the $CO_2$ container being filled.

This valve is used in the system of transferring liquid carbondioxide from one container to another as described in my copending application with the Serial Number 655,285, and is positioned on the upper end of the container being filled, however, it will be understood that this is only one application of this valve as it may also be used for other purposes.

The invention is, therefore, a valve having a casing with a threaded nipple at the lower end in which two connections are provided thru the threaded nipple and these extend to openings in the sides of the casing with valves adapted to regulate the areas of said openings, and an emergency blow off connection is provided in one of the said openings.

The $CO_2$ tanks with which the valve is used are built to withstand considerable pressure and it would, therefore, be very undesirable to provide several openings, or even more than one opening in the tanks and whereas there are many combination valves with various numbers of inlets and outlets and various methods of opening and closing or regulating said inlets and outlets, it is very desirable to provide a valve having two separate and independent openings extending thru a common threaded nipple which may be screwed into the opening at the end of a $CO_2$ tank, and it is also very desirable to provide two separate and independent passages extending thru said valve with separate and independent means regulating the passage of fluids thru said openings.

It is possible to obtain such a connection by using pipe fittings with valves in combination therewith or to use any standard valves in combination so that the valves connect to a common nipple that may be screwed into the upper end of the container, however, any such connection has proved inadequate as the possibility of leakage is increased and also as the in-going and out-going fluids mix in the nipple, whereas it is essential that one fluid pass directly downward into the container so that it will force a gas out of the upper end of the container thru the outlet connection.

The object of the invention is, therefore, to provide a valve which may be screwed into the threaded opening of a container thru which separate and independent inlet and outlet connections may be provided to said container.

Another object is to provide a combination valve having separate and independent passages in which means are provided regulating the passage of fluid thru the passages independently.

Another object is to provide a valve having two separate and independent passages extending thru a common nipple, in which means is provided in one of the passages to relieve the pressure at a predetermined pressure.

Another object is to provide a combination valve having two separate and independent passages connected thru a common nipple in which the valve parts may be regulated from the interior of the valve and openings to said parts closed to prevent said regulating parts becoming out of adjustment.

A further object is to provide a combination valve which may be made in a comparatively small and unique housing.

And a still further object is to provide a combination valve adapted to operate at high pressures which is of a simple and economical construction.

With these ends in view the invention embodies a valve having a housing with a common nipple at one end in which inlet and outlet connections are provided thru the same nipple, and these connections extend thru the housing and are provided with independent valves operated by independent valve stems, and one of the connections is provided with a safety blow off.

Other features and advantages of the invention will appear from the following description taken in connection with the drawing, wherein.

Figure 1:
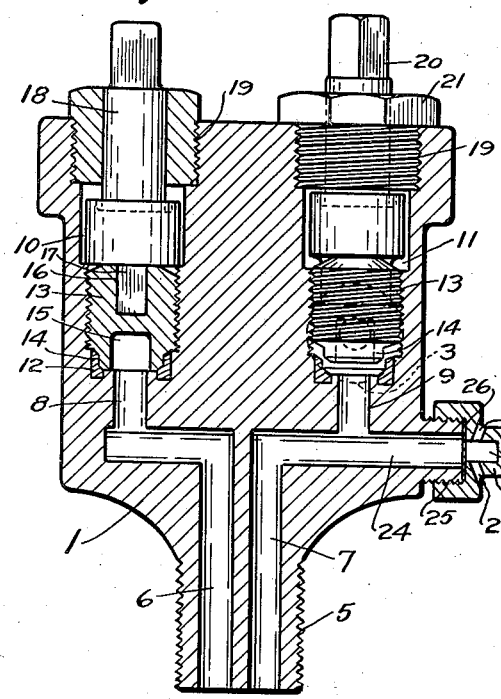
Figure 1 is a vertical cross section thru the valve casing showing one of the valve members in section.
Figure 2:
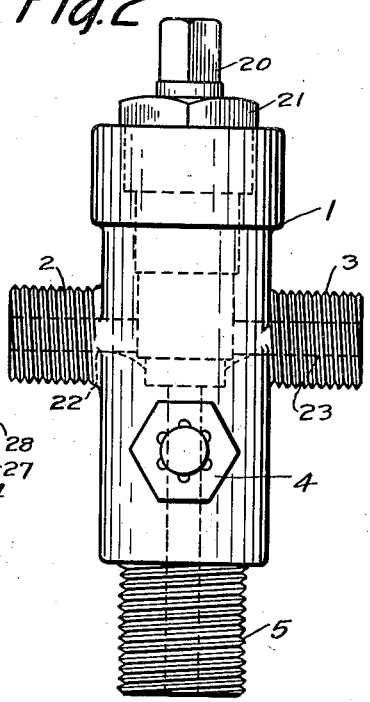
Figure 2 is an end view of the valve casing.
Figure 3:
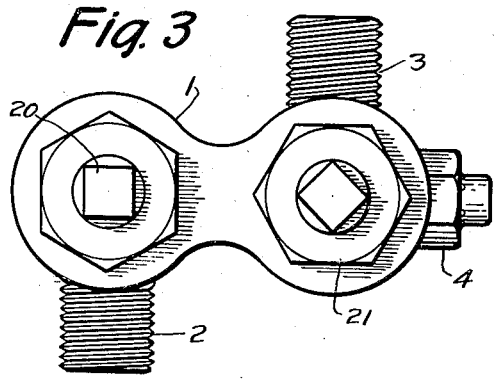
Figure 3 is a plan view of the casing.
Figure 4:
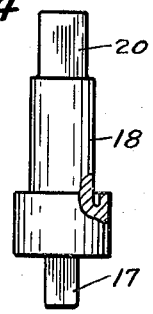
Figure 4 is a detail showing the valve operating member.
Figure 7:
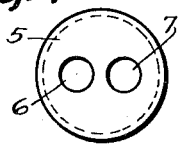
Figure 7 is a view showing the end of the nipple at the lower end of the valve casing.
Figure 6:
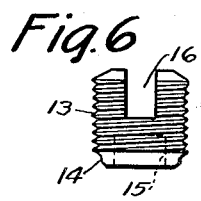
Figure 6 is a detail showing the valve closing member.
Figure 5:
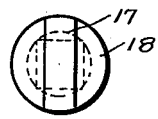
Figure 5 is an end view of the member shown in Figure 4.

In the drawing the valve is shown as it would be made wherein numeral 1 indicates the casing, numeral 2 the inlet connection, numeral 3 the outlet connection, and numeral 4 a blow-off fitting.

It will be understood that although the connection 2 is designated as an inlet and the connection 3 an outlet, the connection 2 may be the outlet, and the connection 3 the inlet, or these may be arranged as may be desired. The casing 1 may also be of any shape or design and the valve members and passages may be arranged therein in any manner and these may be of any shape or design. At one end of the casing is a common nipple 5 having openings 6 and 7 therein which connect to the inlet 2 and outlet 3 respectively. These openings may be round, as shown, or of any shape and may extend thru the valve casing in any manner.

The openings 6 and 7 are connected by vertical passages 8 and 9 to the valves and the valves are located in the lower ends of openings 10 and 11. As the valve members and operating parts are identical, the same reference numerals will be used for both in the following description. In the lower ends of the valve openings are valve seats 12 which may be made of bakelite or any suitable material and the valve closing members 13, which are threaded in the lower portion of the valve openings, are provided with surfaces 14 which engage the surfaces of the valve seats 12. These members 13 are provided with recesses 15 in their lower ends and slots 16 in their upper ends into which tongues 17 on the lower end of the valve operating members 18 extend and it will be noted that as the valve operating members are rotated, they will rotate the valve closing members 13 and move them upward or downward thru the threads. The valve operating members 18 are slidably held in glands 19 which are threaded in the upper ends of the openings 10 and 11 and the upper ends of these members are provided with square shanks 20 by which they may be turned by a wrench or the like. Although the shanks 20 are shown as being square, it will be understood that they may be hexagonal, or provided with any number of sides or formed in any manner so that they may be gripped and rotated in order to adjust the positions of the valves. The glands are provided with nuts 21 so that they may also be gripped and turned and it will be understood that any packing means may be used or any means may be used for packing the upper ends of the valve members.

The connections 2 and 3 are provided with openings 22 and 23 which extend thru the casing and communicate with the lower ends of the openings 10 and 11 around the valve members so that as the members 13 are raised, fluids may pass from the openings 6 and 7 thru the passages 8 and 9 thru the valves, and also thru the passages 22 and 23.

In the design shown the connection 7 is provided with an extension 24 which extends thru a nipple 25 at one side of the casing and a relief or blow-off gasket 4 is threaded on this nipple and forms a closure for the extension 24. Between the inner surface of the gasket and the end of the nipple is a thin copper disc 26 which completely closes this connection, however, should the pressure in the passage or in the container to which the passage is connected exceed a predetermined amount, it will blow out the disc 26 and thereby relieve the pressure. The member 4 is provided with a recess 27 and openings 28 which connect the interior thereof to the atmosphere. It will be understood that any other material may be used instead of copper for the disc 26 and any other means may be used for providing a blow-off connection. It will also be understood that the blow-off connection may be provided in the opening 6 instead of the opening 7 or similar connections may be provided in both openings, as may be desired.

It will be understood that other changes may be made in the device without departing from the spirit of the invention. One of which changes may be in the use of a housing of any other design or arrangements, another may be in the location of the inlet and outlet connections, as it will be noted that both of these may be made from the same side or from any other point or points of the housing, another may be in the use of valves of a different type, another may be in the use of other means for operating the valves, another may be in the location of the valve operating means, and still another may be in the use of other means for providing a blow off connection or means for relieving the pressure when the pressure exceeds a predetermined amount.

The construction will readily be understood from the foregoing description. In use the valve may be provided as shown and described and it will be noted that it may be screwed into the opening of a $CO_2$ container with the inlet and outlet connections connected to a filling or supply container with the inlet connection connected to the lower end of the container and the outlet connection connected to the upper end thereof. It will, therefore, be noted that as the inlet connection is opened, carbondioxide will be transferred from the upper or filling container to the other container by gravity and carbondioxide gas will pass from the lower container backward to the top of the upper or filling container thru the return connection. This device may readily be installed as it is only necessary to remove the closure from the $CO_2$ container and insert this valve, and then make the connections from the inlet and outlet openings to the lower and upper ends of the supply or filling container respectively. The valves in the passages thru the housing may readily be set to permit any desired amount of fluid to pass thru the device and these may be regulated as may be desired. With the connections formed in this manner carbondioxide may readily be transferred from one container to another and as the return passage is provided with a blow-off or pop-off connection, all danger is removed and one container after another may readily be filled.

Having thus fully described the invention what I claim as new and desire to secure by Letters Patent, is:

1. A valve of the type having a substantially flat body portion with parallel openings therein and having a nipple extending from one end thereof with independent parallel passages extending thru said nipple and communicating with said parallel openings, said body portion having laterally extending openings also communicating with said parallel openings and extending thru threaded nipples extending outward from the sides thereof, valve seats in the inner ends of said parallel openings, valve members in said parallel openings adapted to engage said valve seats, valve stems extending from said valve members thru the outside of said valve body freely connected to said valve members, and bushings threaded in said valve body around said valve stems.

2. A valve as described in claim 1 in which the valve members are provided with transverse slots and the valve stems are provided with tongues engaging with said slots to turn said valve members.

3. A valve as described in claim 1 in which the valve seats are removable and replaceable.

4. A valve as described in claim 1 in which the valve members are threaded in the parallel openings.

5. A valve as described in claim 1 in which the valve members are threaded in the parallel openings, and said valve members are provided with slots into which tongues of the valve stems extend.

6. A valve as described is claim 1 in which the valve members are threaded in the walls of the parallel openings and adapted to be adjusted thru the valve stems, said valve stems adapted to be removed indepedent of said valve members.

R. B. NEWBERN.